(12) United States Patent
Arita et al.

(10) Patent No.: US 9,915,337 B2
(45) Date of Patent: Mar. 13, 2018

(54) GEAR TRANSMISSION AND USAGE MEASURING DEVICE FOR MEASURING USAGE OF GEAR TRANSMISSION

(71) Applicants: FANUC CORPORATION, Minamitsuru-gun, Yamanashi-ken (JP); NABTESCO CORPORATION, Tokyo (JP)

(72) Inventors: Souichi Arita, Yamanashi-ken (JP); Masahiro Matsubayashi, Kobe (JP)

(73) Assignees: FANUC CORPORATION, Yamanashi-ken (JP); NABTESCO CORPORATION, Tokyo (JP)

( * ) Notice: Subject to any disclaimer, the term of this patent is extended or adjusted under 35 U.S.C. 154(b) by 254 days.

(21) Appl. No.: 14/722,500

(22) Filed: May 27, 2015

(65) Prior Publication Data
US 2015/0345611 A1 Dec. 3, 2015

(30) Foreign Application Priority Data
May 28, 2014 (JP) .................................. 2014-110437

(51) Int. Cl.
*G01M 13/02* (2006.01)
*G01H 1/00* (2006.01)
*F16H 57/01* (2012.01)

(52) U.S. Cl.
CPC .............. *F16H 57/01* (2013.01); *G01H 1/003* (2013.01); *G01M 13/021* (2013.01); *F16H 2057/012* (2013.01)

(58) Field of Classification Search
CPC .. F16H 7/01; F16H 2057/012; G01M 13/021; G01H 1/003

(Continued)

(56) References Cited

U.S. PATENT DOCUMENTS 5,925,819 A * 7/1999 Yoshinaga .............. F02P 17/12
324/399
7,027,909 B2 * 4/2006 deBotton .............. G01M 15/12
701/111

(Continued)

FOREIGN PATENT DOCUMENTS

CN 1221081 A 6/1999
CN 101116042 A 1/2008

(Continued)

OTHER PUBLICATIONS

Extended European Search Report as issued in European Patent Application No. 15169715.8, dated Nov. 5, 2015.

(Continued)

*Primary Examiner* — J M Saint Surin
(74) *Attorney, Agent, or Firm* — Pillsbury Winthrop Shaw Pittman LLP (57) ABSTRACT

A usage measuring device measures usage of a gear transmission. The usage measuring device is provided with an oscillation cycle measuring unit and a comparing unit. The oscillation cycle measuring unit measures an oscillation cycle of a state signal indicating at least one of a rotational state of an input unit side and a rotational state of an output unit side of the gear transmission. The comparing unit compares a first oscillation cycle measured during an initial operating period of the gear transmission, and a second oscillation cycle measured after the gear transmission has operated for a predetermined time. The oscillation cycle measuring unit measures the first oscillation cycle and the second oscillation cycle of the state signal after the gear transmission has stopped driving.

13 Claims, 4 Drawing Sheets

(58) Field of Classification Search
 USPC .......................................................... 73/658
 See application file for complete search history.

(56) References Cited

U.S. PATENT DOCUMENTS

| | | | |
|---|---|---|---|
| 2002/0029115 A1* | 3/2002 | Moriuchi | B23Q 11/00 |
| | | | 702/34 |
| 2004/0236494 A1 | 11/2004 | DeBotton et al. | |
| 2008/0133176 A1 | 6/2008 | Kashio et al. | |
| 2010/0063775 A1* | 3/2010 | Colling | G01M 15/00 |
| | | | 702/182 |
| 2012/0065781 A1 | 3/2012 | Ikeda et al. | |

FOREIGN PATENT DOCUMENTS

| | | |
|---|---|---|
| CN | 102431043 A | 5/2012 |
| EP | 1 186 975 A2 | 3/2002 |
| EP | 2 431 137 A2 | 3/2012 |
| JP | S63-123105 A | 5/1988 |
| JP | 2006-102889 A | 4/2006 |
| JP | 2008-249549 A | 10/2008 |
| WO | WO 2007/072937 A1 | 6/2007 |

OTHER PUBLICATIONS

Communication pursuant to Article 94(3) EPC—EP Application No. 15 169 715.8 dated Jan. 5, 2018.
Office Action Chinese Patent Application No. 201510282795.4 dated Dec. 14, 2017 with partial English translation.

* cited by examiner

GEAR TRANSMISSION AND USAGE MEASURING DEVICE FOR MEASURING USAGE OF GEAR TRANSMISSION

TECHNICAL FIELD

This application claims priority to Japanese Patent Application No. 2014-110437 filed on May 28, 2014, the contents of which are hereby incorporated by reference into the present application.

The present specification discloses a technique relating to a gear transmission and a usage measuring device for measuring usage of the gear transmission.

BACKGROUND ART

A gear transmission is known that is disposed between a motor and a work (driven member), and transmits torque of the motor to the work. Since the gear transmission deteriorates in accordance with usage, it is necessary to perform maintenance, replacement, or the like. Therefore, it is necessary to determine whether an abnormality is occurring in the gear transmission, or predict whether an abnormality will occur in the gear transmission in the near future. In Japanese Patent Application Publication No. S63-123105, a gear transmission in which an abnormality is not occurring is driven in advance under predetermined conditions, a drive pattern of the work is measured, and a reference value of the drive pattern is stored. Further, when an abnormality in the gear transmission occurs, the drive pattern of the work is measured, and a threshold value is set based on the change in the drive pattern. In Japanese Patent Application Publication No. S63-123105, after the gear transmission has operated for a predetermined time, the gear transmission is driven under the same conditions as when measuring the reference value, changes in the drive pattern of the work relative to the reference value and the threshold value are compared, and the state of the gear transmission is determined. Below, Japanese Patent Application Publication No. S63-123105 is referred to as Patent Document 1.

SUMMARY OF INVENTION

In Patent Document 1, in order to determine whether an abnormality is occurring in the gear transmission (whether an abnormality will occur in the near future), it is necessary, after the gear transmission has been operated for a predetermined time, to stop the operation of the gear transmission, and drive the gear transmission under the same conditions as when the reference value was measured. That is, the state of the gear transmission must be inspected offline. The present specification is intended to solve the above problem, and discloses a technique for measuring the state of the gear transmission online.

The technique disclosed by the present specification relates to a usage measuring device for measuring usage of a gear transmission. This usage measuring device comprises an oscillation cycle measuring unit and a comparing unit. The oscillation cycle measuring unit measures an oscillation cycle of a state signal indicating at least one of a rotational state of an input unit side and a rotational state of an output unit side of the gear transmission. The comparing unit compares a first oscillation cycle measured during an initial operating period of the gear transmission, and a second oscillation cycle measured after the gear transmission has been operated for a predetermined time. In this usage measuring device, the oscillation cycle measuring unit measures the first oscillation cycle and the second oscillation cycle of the state signal after the driving of the gear transmission has stopped.

"Usage of the gear transmission" herein means, for example, an index indicating current degree of progression in the deterioration of the gear transmission relative to a limit value 100, letting the limit value 100 be a number of times of usage (operating time) to reach a lifespan when the gear transmission is operated at rated torque. Usage is often greater in the case of driving heavy work than in the case of driving light work, even if the operating time of the gear transmission is the same. By measuring the usage, it is possible to predict the lifetime of the gear transmission in case of continuing to drive the work at the current status. That is, it is possible to predict the remaining lifetime of the gear transmission. Moreover, the usage may be expressed as a percentage of the limit value 100, or as a difference from the limit value 100.

"State signal indicating a rotational state of an input unit side of the gear transmission" herein refers to, e.g., a supply current to a motor transmitting torque to the gear transmission, a signal corresponding to a rotation angle of an output shaft of the motor, a signal corresponding to output torque of the output shaft of the motor, a signal corresponding to a rotation angle of an input shaft of the gear transmission, etc. Further, "state signal indicating a rotational state of an output unit side of the gear transmission" herein refers to, e.g., a signal corresponding to a rotation angle of an output unit of the gear transmission, a signal corresponding to output torque of the output unit of the gear transmission, a signal corresponding to acceleration of a driven member attached to the output unit of the gear transmission, etc.

"Initial operating period of the gear transmission" herein includes a test operating period for verifying the operation of the gear transmission with the work in a state of being attached to the gear transmission, and a period from the gear transmission actually starting an operation of driving the work until before deterioration occurs in the gear transmission.

The usage measuring device measures the state signal after the driving of the gear transmission has stopped. When the driving of the gear transmission stops, the input unit side and the output unit side of the gear transmission do not rotate. However, immediately after the gear transmission has stopped driving, the state signal continues to occur for a short time even though the gear transmission is not driving. The usage measuring device measures the oscillation cycle of this residual signal immediately after the gear transmission has stopped driving. Moreover, "after the gear transmission has stopped driving" includes not only immediately after completing operation of the gear transmission, but also during stop of the gear transmission, when the gear transmission is operated so as to repeat driving and stopping. Further, the usage measuring device is not restricted to a type that measures one state signal, but may further include a type that measures a plurality of state signals (e.g., signals based on the supply current to the motor and the rotation angle of the output unit of the gear transmission).

The usage measuring device measures the usage of the gear transmission immediately after operation of the gear transmission has ended, or during the stop (while at rest) of the gear transmission that is operated repeatedly driving and stopping. Therefore, the state of the gear transmission can be measured while the gear transmission is in a state of having operated. Specifically, the usage measuring device does not require an operation such as removing the work from the gear transmission and attaching a reference heavy object to the gear transmission in order to measure usage. That is, the usage measuring device can measure the state of the gear transmission online. Moreover, the oscillation cycle varies according to the deterioration of the gear transmission. More specifically, as the deterioration of the gear transmission progresses, the oscillation cycle becomes longer. Consequently, the usage of the gear transmission can be measured by measuring the amount of change (or rate of change) of a second oscillation cycle relative to a first oscillation cycle.

DESCRIPTION OF EMBODIMENTS

Figure 1:
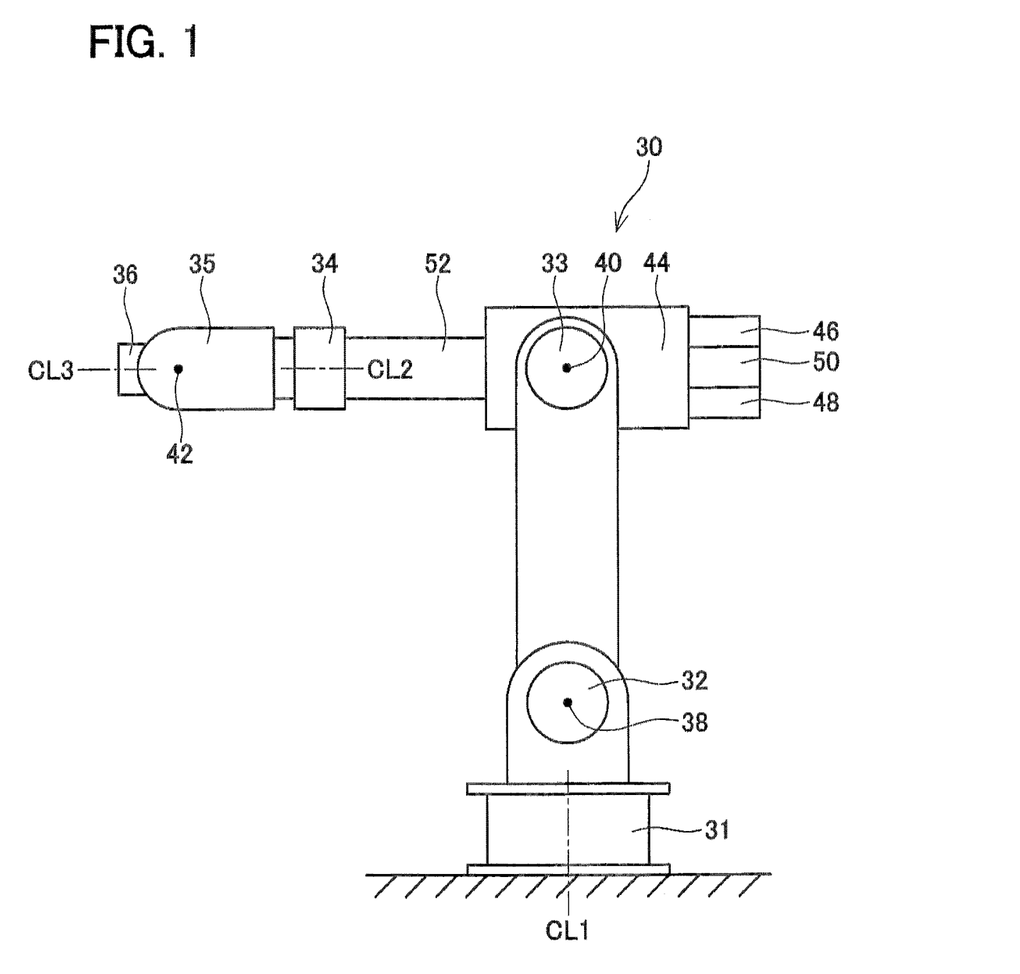
FIG. 1 shows an appearance of an industrial robot.

FIG. 1 shows an appearance of an industrial robot 30. A gear transmission taught by the present specification is used in, e.g., joint portions of the industrial robot 30. The industrial robot 30 has a first joint 31, a second joint 32, a third joint 33, a fourth joint 34, a fifth joint 35, and a sixth joint 36. That is, the industrial robot 30 operates by combining the rotational movements of 6 axes. The first joint 31 is fixed to an installation surface, and is rotatable around a central axis CL1, the second joint 32 is rotatable around a central axis 38, the third joint 33 is rotatable around a central axis 40, the fourth joint 34 is rotatable around a central axis CL2, the fifth joint 35 is rotatable around a central axis 42, and the sixth joint 36 is rotatable around a central axis CL3. A robot hand (not shown) is fixed to a tip of the sixth joint 36, and carries work (a driven member). Moreover, in terms of what is to be regarded as "work" for each joint, for example, in addition to the part (robot hand, driven member) attached to the sixth joint 36, the second to fifth joints can also be called work for the first joint 31. That is, in the case of the first joint 31, all parts attached to a robot tip side beyond the first joint 31 are work. The same also applies to the second to sixth joints.

A gear transmission is incorporated into each of the joints 31 to 36. The gear transmission is typically a reduction gear. The first joint 31, the second joint 32 and the third joint 33 are called the three base axes of the industrial robot 30. The fourth joint 34, the fifth joint 35 and the sixth joint 36 are called the three wrist axes of the industrial robot 30. The joints 34, 35 and 36 form a tip portion of a forearm 52 of the robot. The fourth joint 34 reduces the rotation speed of a motor 46 attached to a shoulder 44, and causes a member installed on a tip side than the fourth joint 34 to rotate around the central axis CL2. The fifth joint 35 reduces the rotation speed of a motor 48 attached to the shoulder 44, and causes a member installed on the tip side than the fifth joint 35 to rotate around the central axis 42. The sixth joint 36 reduces the rotation speed of a motor 50 attached to the shoulder 44, and causes a member installed on the tip side than the sixth joint 36 to rotate around the central axis CL3. Similarly, the industrial robot 30 also comprises motors (not shown) for driving each of the first joint 31, the second joint 32 and the third joint 33.

Figure 2:
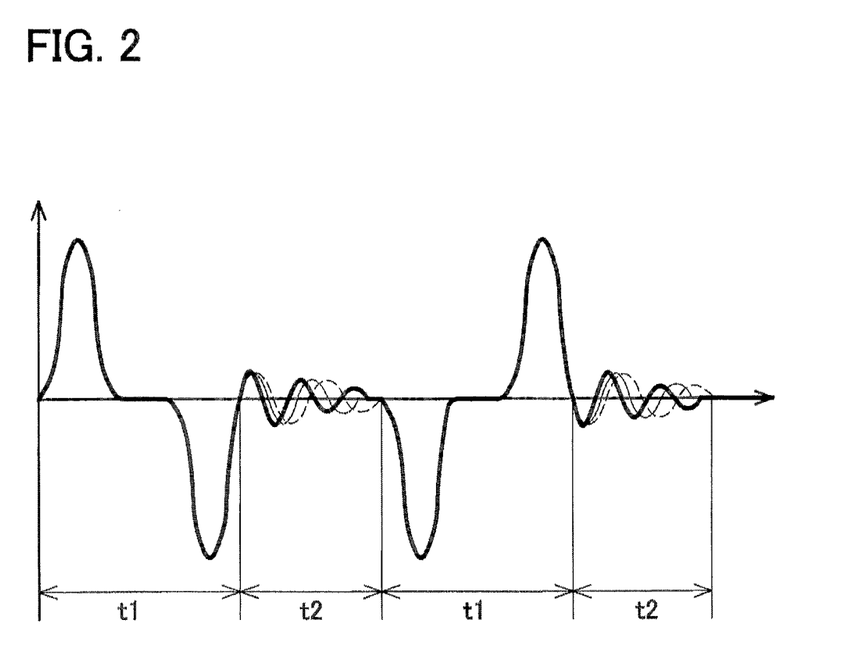
FIG. 2 shows output torque of a motor during operation of a gear transmission.
Figure 3:
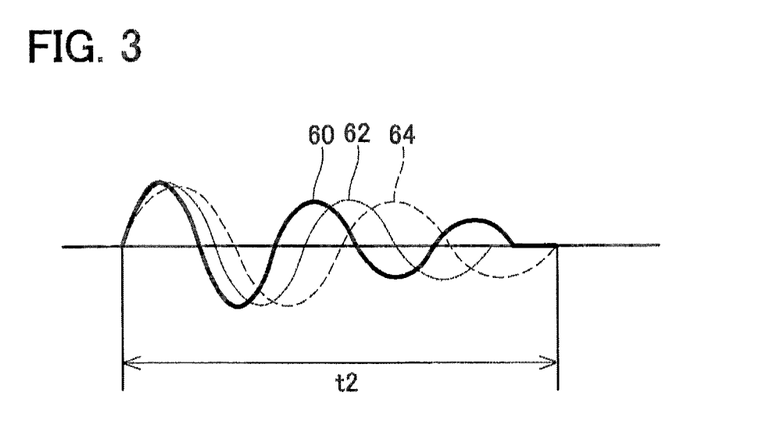
FIG. 3 shows a partially enlarged view of FIG. 2.

FIG. 2 and FIG. 3 show changes in output torque of the motor when operating the gear transmission incorporated into the first joint 31. FIG. 2 shows the changes in output torque for two cycles in a gear transmission in which driving and stopping is repeated, where one cycle is defined as a from the start of the driving of the gear transmission, which is followed by stopping the driving, until the next driving is started. A period t1 is the time from the start to the stopp of the driving of the gear transmission, and a period t2 is the time while the gear transmission is stopped. FIG. 3 shows an enlarged view of the output torque of the motor while the gear transmission is stopped (period t2). FIG. 2 and FIG. 3 show the output torque of the motor immediately after starting the operation (first cycle) after 1,000,000 cycles have elapsed, and after 2,000,000 cycles have elapsed. In FIG. 2 and FIG. 3, a horizontal axis of the graph represents time, and a vertical axis represents output torque of the motor. A curve 60 of FIG. 3 shows the output torque of the motor after starting operation, a curve 62 shows the output torque after 1,000,000 cycles have elapsed, and a curve 64 shows the output torque after 2,000,000 cycles have elapsed.

As shown in FIG. 2 and FIG. 3, the output torque of the motor changes slightly even while the gear transmission is not being driven (while stopped). The oscillation cycle of the motor torque in the period t2 increases as the number of cycles increases. That is, an oscillation cycle when deterioration of the gear transmission has progressed (may be called second oscillation cycle below) becomes larger than an oscillation cycle measured before the occurrence of deterioration in the gear transmission (during an initial operating period; may be called first oscillation cycle below). That is, when the deterioration of the gear transmission progresses, the oscillation cycle of the motor torque after the gear transmission has stopped driving (an oscillation cycle of residual oscillation of the motor torque) becomes larger than the oscillation cycle when deterioration of the gear has not occurred. By measuring the change in the current oscillation cycle (second oscillation cycle) relative to the oscillation cycle during an initial driving period (first oscillation cycle), it is possible to determine the deterioration state of the gear transmission. That is, it is possible to determine the usage of the gear transmission.

Figure 4:
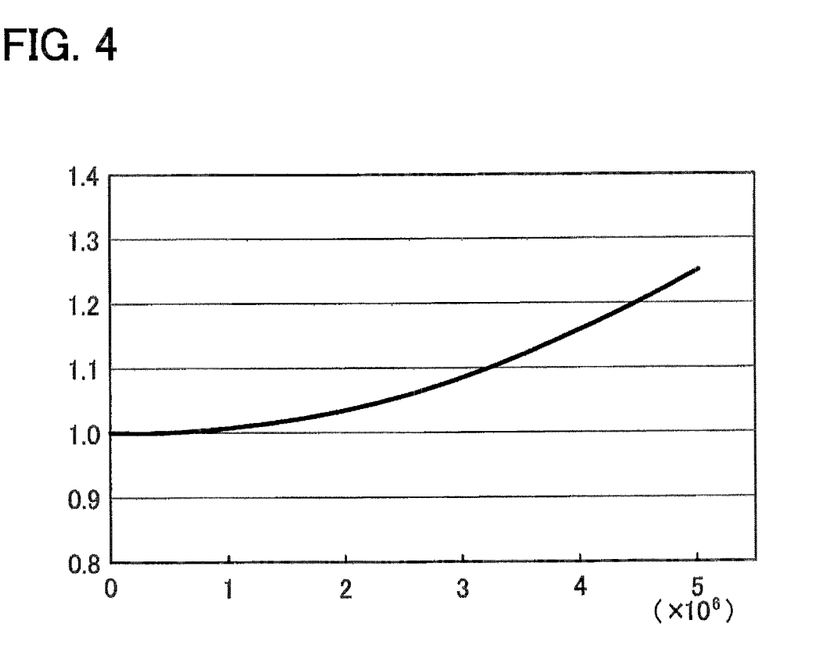
FIG. 4 shows a relationship between number of operating cycles of the gear transmission and changes in oscillation cycle.

FIG. 4 shows the relationship between the number of operating cycles of the gear transmission and changes in the oscillation cycles. The horizontal axis of the graph represents the number of operating cycles, and the vertical axis represents the ratio of the first oscillation cycle and the second oscillation cycle (second oscillation cycle/first oscillation cycle). That is, the vertical axis of the graph represents the ratio of the second oscillation cycle relative to the first oscillation cycle when the first oscillation cycle is "1". In the description below, a numerical value obtained by dividing the second oscillation cycle by the first oscillation cycle is called a comparison value. Moreover, FIG. 4 is a graph based on the results of measuring the oscillation cycle every five hundred thousand cycles while the gear transmission is operating until five million cycles.

As shown in FIG. 4, the comparison value increases as the number of operating cycles increases. As a result, when deterioration occurs in the gear transmission, the comparison value is shown to be increasing. Consequently, in the aforementioned gear transmission, if a comparison value (called threshold value below) when an abnormality occurs in the gear transmission is measured in advance, the usage and the remaining life of the gear transmission can be predicted by calculating the current comparison value.

Figure 5:
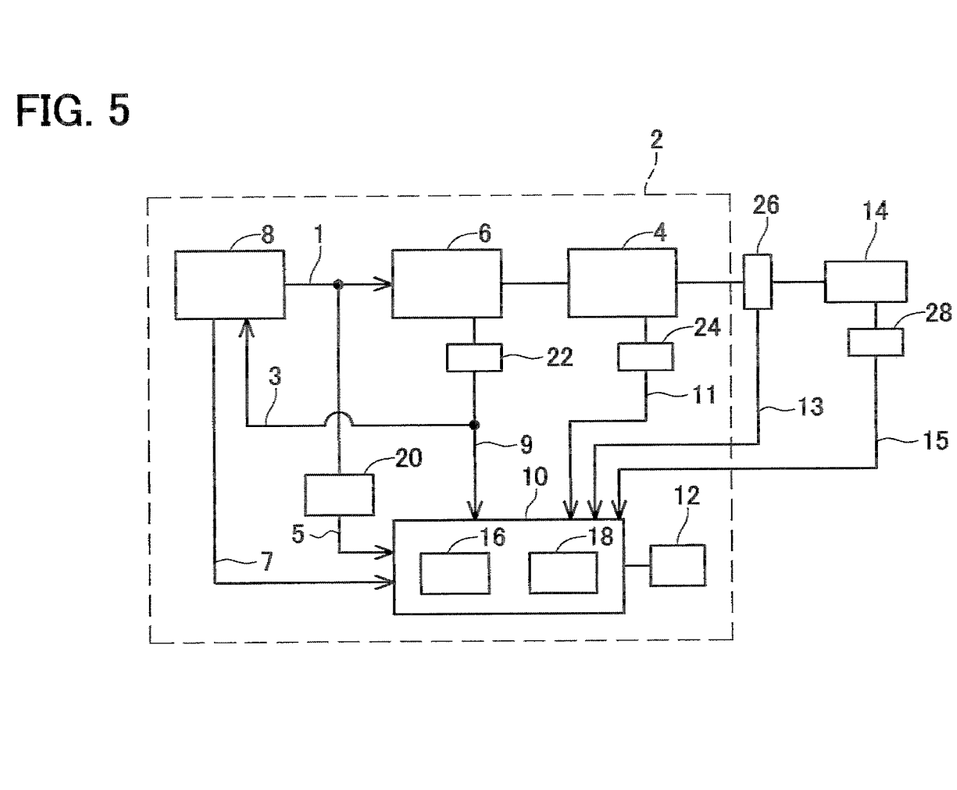
FIG. 5 shows a block diagram of the gear transmission.

FIG. 5 shows a gear transmission 2. FIG. 5 shows a configuration by which the gear transmission 2 drives work 14. The gear transmission 2 comprises a gear transmission mechanism 4, a motor 6, a motor controller 8, and a usage measuring device 10. The motor 6 and the work 14 are attached to the gear transmission mechanism 4. This type of gear transmission 2 is incorporated into each joint 31-36 of the industrial robot 30. An ammeter 20 is disposed between the motor controller 8 and the motor 6, a first encoder 22 is connected to the motor 6, a second encoder 24 is connected to the gear transmission mechanism 4, a torque sensor 26 is disposed between the gear transmission mechanism 4 and the work 14, and an acceleration sensor 28 is connected to the work 14. The ammeter 20 and the first encoder 22 are disposed at an input unit side of the gear transmission mechanism 4. The second encoder 24, the torque sensor 26 and the acceleration sensor 28 are disposed at an output unit side of the gear transmission mechanism 4.

The motor 6 operates based on an output signal from the motor controller 8. Specifically, current is supplied via wiring 1 to the motor 6 from a current amplifier (not shown) incorporated into the motor controller 8. An output shaft (not shown) of the motor 6 is connected to an input shaft (not shown) of the gear transmission mechanism 4. Therefore, it is possible to measure the rotational state of the input unit side (typically an input shaft of the gear transmission mechanism 4) of the gear transmission mechanism 4 by detecting the supply current to the motor 6 using the ammeter 20. A current value detected by the ammeter 20 is input to the usage measuring device 10 via wiring 5. The current supplied to the motor 6 is an example of a state signal indicating a rotational state of the input unit side of the gear transmission mechanism 4.

The first encoder 22 detects the rotation angle of the output shaft of the motor 6. Information detected by the first encoder 22 is fed back to the motor controller 8 via wiring 3. Specifically, the first encoder 22 inputs a signal (current) corresponding to the rotation angle of the output shaft of the motor 6 to the motor controller 8. The motor controller 8 adjusts an output signal to the motor 6 (the supply current to the motor 6) in response to an input signal from the first encoder 22. An output signal of the first encoder 22 is also input to the usage measuring device 10 via wiring 9. The output signal of the first encoder 22 is an example of a state signal indicating a rotational state of the input unit side of the gear transmission mechanism 4.

The type of signal which has been output by the motor controller 8 to the motor 6 is input to the usage measuring device 10 via wiring 7. Specifically, it is input to the usage measuring device 10 whether the motor controller 8 is outputting a signal to drive the motor 6 or is outputting a signal to stop the motor 6. In other words, it is input to the usage measuring device 10 via wiring 7 whether the motor 6 (the gear transmission mechanism 4) is in either state of the period t1 and the period t2 (see also FIG. 2).

Output torque of the motor 6 (rotation torque of the output shaft) is amplified by the gear transmission mechanism 4 (the rotation speed of the output shaft of the motor 6 is decelerated). The second encoder 24 is connected to an output unit of the gear transmission mechanism 4. The second encoder 24 detects the rotation angle of an output shaft of the gear transmission mechanism 4. The second encoder 24 generates a signal (typically current) corresponding to the rotation angle of the output unit of the gear transmission mechanism 4, and this signal is input to the usage measuring device 10 via wiring 11. An output signal of the second encoder 24 is an example of a state signal indicating rotational state of the output unit side of the gear transmission mechanism 4.

The torque sensor 26 detects output torque of the gear transmission mechanism 4. The torque sensor 26 generates a signal (typically current) corresponding to the output torque of the gear transmission mechanism 4, and this signal is input to the usage measuring device 10 via wiring 13. An output signal of the torque sensor 26 is an example of a state signal indicating a rotational state of the output unit side of the gear transmission mechanism 4.

The acceleration sensor 28 detects acceleration of the work 14. Moreover, since the work 14 is fixed to the output unit of the gear transmission mechanism 4, the acceleration sensor 28 can also be said to detect the acceleration of the output unit of the gear transmission mechanism 4. The acceleration sensor 28 generates a signal (typically current) corresponding to the acceleration signal of the work 14, and this signal is input to the usage measuring device 10 via wiring 15. An output signal of the acceleration sensor 28 is an example of a state signal indicating a rotational state of the output unit side of the gear transmission mechanism 4.

The usage measuring device 10 comprises a frequency analysis unit 16 and a comparing unit 18. The frequency analysis unit 16 is an example of an oscillation cycle measuring unit. An example of the frequency analysis unit is an oscilloscope. At least one of the following processes (1) to (5) is performed by the frequency analysis unit 16 (a plurality of the processes (1) to (5), or all the processes (1) to (5) may be performed).

Process (1): the frequency analysis unit 16 measures the oscillation cycle based on the output signal (current) to the motor 6 while the output unit of the gear transmission mechanism 4 is stopped (while the motor controller 8 is outputting the signal to stop the motor 6). That is, the frequency analysis unit 16 measures the oscillation cycle of the period t2. The output signal to the motor 6 is detected by the ammeter 20. The comparing unit 18 performs a comparison of an oscillation cycle (first oscillation cycle Ts1), which was measured on the basis of the output signal output to the motor 6 during the period t2 having taken place for a first time (initial operating period) of the gear transmission mechanism 4, and an oscillation cycle (second oscillation cycle Tx1) during the most recent period t2 of x1-th time cycle measured by the frequency analysis unit 16. Specifically, the second oscillation cycle Tx1 is divided by the first oscillation cycle Ts1 to calculate a comparison value Ta1, and a comparison with a threshold value Tt stored in the comparing unit 18 is performed. That is, it is determined whether the oscillation cycle is (a) or (b) below.

$$Tx1/Ts1=Ta1>Tt \qquad (a)$$

$$Tx1/Ts1=Ta1 \leq Tt \qquad (b)$$

Process (2): the frequency analysis unit 16 detects the oscillation cycle based on the output signal (current) from the first encoder 22 while the output unit of the gear transmission mechanism 4 is stopped. The first encoder 22 generates the output signal based on the rotation angle of the output shaft of the motor 6. The comparing unit 18 performs a comparison of an oscillation cycle (first oscillation cycle Ts2), which was measured on the basis of the rotation angle of the output shaft of the motor 6 detected during the first-time cycle period t2 of the gear transmission mechanism 4, and an oscillation cycle (second oscillation cycle Tx2) during the most recent period t2 of x2-th time cycle measured by the frequency analysis unit 16. Specifically, the second oscillation cycle Tx2 is divided by the first oscillation cycle Ts2 to calculate a comparison value Ta2, and a comparison with the threshold value Tt stored in the comparing unit 18 is performed. That is, it is determined whether the oscillation cycle is (c) or (d) below.

$$Tx2/Ts2=Ta2>Tt \qquad (c)$$

$$Tx2/Ts2=Ta2 \leq Tt \qquad (d)$$

Process (3): the frequency analysis unit 16 detects the oscillation cycle based on the output signal (current) from the second encoder 24 while the output unit of the gear transmission mechanism 4 is stopped. The second encoder 24 generates the output signal corresponding to the rotation angle of the output shaft of the gear transmission mechanism 4. The comparing unit 18 performs a comparison of an oscillation cycle (first oscillation cycle Ts3), which was measured on the basis of the rotation angle of the output shaft of the motor 6 detected during the first-time cycle period t2 of the gear transmission mechanism 4, and an oscillation cycle (second oscillation cycle Tx3) during the most recent period t2 of x3-th time cycle measured by the frequency analysis unit 16. Specifically, the second oscillation cycle Tx3 is divided by the first oscillation cycle Ts3 to calculate a comparison value Ta3, and a comparison with the threshold value Tt stored in the comparing unit 18 is performed. That is, it is determined whether the oscillation cycle is (e) or (f) below.

$$Tx3/Ts3=Ta3>Tt \qquad (e)$$

$$Tx3/Ts3=Ta3 \leq Tt \qquad (f)$$

Process (4): the frequency analysis unit 16 detects the oscillation cycle based on the output signal (current) from the torque sensor 26 while the output unit of the gear transmission mechanism 4 is stopped. The torque sensor 26 generates a signal (current) between the output shaft of the gear transmission mechanism 4 and the work 14, this signal corresponding to torque applied to the work 14 from the output shaft of the gear transmission mechanism 4. The comparing unit 18 performs a comparison of an oscillation cycle (first oscillation cycle Ts4), which was measured on the basis of the output torque from the output shaft of the gear transmission mechanism 4 detected during the first-time cycle period t2 of the gear transmission mechanism 4, and an oscillation cycle (second oscillation time cycle Tx4) during the most recent period t2 of x4-th cycle measured by the frequency analysis unit 16. Specifically, the second oscillation cycle Tx4 is divided by the first oscillation cycle Ts4 to calculate a comparison value Ta4, and a comparison with the threshold value Tt stored in the comparing unit 18 is performed. That is, it is determined whether the oscillation cycle is (g) or (h) below.

$$Tx4/Ts4=Ta4>Tt \qquad (g)$$

$$Tx4/Ts4=Ta4 \leq Tt \qquad (h)$$

Process (5): the frequency analysis unit 16 detects the oscillation cycle based on the output signal (current) from the acceleration sensor 28 while the output unit of the gear transmission mechanism 4 is stopped. The acceleration sensor 28 generates an output signal corresponding to the acceleration of the work 14. The comparing unit 18 performs a comparison of an oscillation cycle (first oscillation cycle Ts5), which was measured on the basis of the acceleration of the work 14 detected during the first-time cycle period t2 of the gear transmission mechanism 4, and an oscillation cycle (second oscillation cycle Tx5) during the most recent period t2 of x5-th time cycle measured by the frequency analysis unit 16. Specifically, the second oscillation cycle Tx5 is divided by the first oscillation cycle Ts5 to calculate a comparison value Ta5, and a comparison with the threshold value Tt stored in the comparing unit 18 is performed. That is, it is determined whether the oscillation cycle is (i) or (j) below.

$$Tx5/Ts5=Ta5>Tt \qquad (i)$$

$$Tx5/Ts5=Ta5 \leq Tt \qquad (j)$$

In the processes (1) to (5) above, signals (current) for measuring the oscillation cycle are different. Since the targets to be detected are different, the shape of each of the first oscillation cycles Ts1 to Ts5, and the shape of each of the second oscillation cycles Tx1 to Tx5 are different. However, in the case of any of the processes (1) to (5) above, the second oscillation cycle is divided by the first oscillation cycle, and therefore if calculated in the same number of cycles, the comparison values Ta1 to Ta5 are substantially the same value. Therefore, if at least one of the processes (1) to (5) is performed, it is possible to measure the ratio of the second oscillation cycle relative to the first oscillation cycle, Therefore, in the following description, an example of implementing process (1) is described, and a description of the processes (2) to (5) may be omitted.

Moreover, the threshold value Tt is a constant preset by experimentation or the like. The threshold value Tt is a constant used for determining whether an abnormality is occurring in the gear transmission (gear transmission mechanism). Specifically, a load is attached to the gear transmission, driving and stopping is repeated until an abnormality occurs in the gear transmission, and the oscillation cycle continues to be detected when the output unit of the gear transmission is stopped (period t2). An oscillation cycle Tb when an abnormality has occurred in the gear transmission is divided by an oscillation cycle Tsb in the initial operating period, determining the threshold value Tt (Tt=Tb/Tsb). Further, for safety, the threshold value Tt may be determined using an oscillation cycle Ty that is y cycles before an abnormality occuring in the gear transmission. That is, Tt=Ty/Tsb is possible.

A notification unit 12 comprises a lamp and a speaker (not shown). In case the determination result of the comparing unit 18 is (b), (d), (f), (h) or (j), the lamp of the notification unit 12 is lit green. In case the determination result of the comparing unit 18 is (a), (c), (e), (g) or (i), the lamp of the notification unit 12 is lit red, and a warning sound is transmitted from the speaker. Thereby, when an abnormality has occurred in the gear transmission mechanism 4 (e.g., when the lifetime of the gear transmission mechanism 4 is reached), it is possible to perform maintenance or the like.

Moreover, the notification unit 12 may further comprise a display unit (not shown) for displaying the usage of the gear transmission. For example, in the case of performing process (1), when the comparison value Ta1 of the first time cycle (Ta1=1) is set to 0%, and the threshold value Tt is set to 100%, the display unit may display the percentage to which the current (x1-th cycle) comparison value Ta1 corresponds to the threshold value Tt. Thereby, it is possible to know the current usage of the gear transmission. That is, it is possible to predict the remaining life of the gear transmission.

The first encoder 22 may be attached to the input unit of the gear transmission mechanism 4. Further, the motor 6 and the first encoder 22 may be integral. That is, the gear transmission mechanism may be driven by a motor provided with an encoder. In this case, the first encoder 22 may be omitted. For example, in the case of performing only process (1), the first encoder 22, the second encoder 24, the torque sensor 26 and the acceleration sensor 28 may be omitted, Depending on the process to be implemented, at least one of the ammeter 20, the first encoder 22, the second encoder 24, the torque sensor 26 and the acceleration sensor 28 may be disposed. As the number of processes (processes (1) to (5)) to be implemented increases, more accurate usage can be obtained. Further, as the number of processes decreases, the configuration of the usage measuring device 10 can be simplified, and the number of measuring devices (the ammeter 20, the first encoder 22, the second encoder 24, the torque sensor 26 and the acceleration sensor 28) can be reduced.

The x1-th to x5-th time cycles above may be the same cycles, or may be different cycles. Further, the timing for measuring the second oscillation cycles Tx1 to Tx5 may be such that measurement is performed each time the driving of the gear transmission mechanism 4 stops (each cycle), or may be performed per a predetermined number of cycles. Further, the timing for measuring the second oscillation cycles Tx1 to Tx5 may be such that measurement is performed at a time when, after a predetermined time has elapsed since starting operation of the gear transmission mechanism 4, driving was initially stopped. Alternatively, the second oscillation cycles Tx1 to Tx5 may be measured immediately after the operation of one day has ended. That is, the timing for measuring the second oscillation cycles Tx1 to Tx5 can be set arbitrarily.

Only the gear transmission mechanism (gear transmission) 4 may be incorporated into the joints 31 to 36 of the industrial robot 30, and the motor 6, the motor controller 8, the usage measuring device 10, etc. may be disposed within the industrial robot 30 at another location. Further, it is possible to predict the usage of an existing gear transmission by connecting the usage measuring device 10 to an existing gear transmission. That is, the gear transmission and the usage measuring device 10 may be separate devices. Moreover, the technique taught in the present specification can also be applied to a device other than the robot joint, described above, as long as the device uses a gear transmission.

The first oscillation cycles Ts1 to Ts5 may be measured from the first time cycle onward. That is, the first oscillation cycles Ts1 to Ts5 may be measured for the gear transmission mechanism 4 in a state substantially the same as before use (state in which deterioration has not occurred). In this case, the first oscillation cycles Ts1 to Ts5 are preferably measured within 100,000 cycles of starting operation of the gear transmission mechanism 4. Measuring is performed more preferably within 50,000 cycles, even more preferably within 10,000 cycles, and especially preferably within 1000 cycles. In general, the gear transmission mechanism 4 is designed such that an abnormality does not occur even if the operation of repeatedly driving and stopping is repeated for five million cycles. Therefore, if the first oscillation cycles Ts1 to Ts5 are measured within 100,000 cycles, a value substantially the same as the values of the comparison values Ta1 to Ta5 is shown. Moreover, the first oscillation cycles Ts1 to Ts5 may be measured during a test operation of the gear transmission 2.

Advantages of the gear transmission 2 will be described. As described above, in the gear transmission 2 it is possible to detect the remaining life, abnormality, etc. of the gear transmission 2 based on the oscillation cycle immediately after stopping the driving of the gear transmission 2 (the first oscillation cycles Ts1 to Ts5, the second oscillation cycles Tx1 to Tx5). Therefore, in the gear transmission 2 it is possible to detect the remaining life, abnormality, etc. of the gear transmission 2 in a situation the same as during operation of the gear transmission 2. That is, in the gear transmission 2 it is possible to detect the remaining life, abnormality, etc. online without removal from the work 14, etc. Moreover, since the oscillation cycle is measured while the motor 6 is stopped (the period t2), the oscillation cycle to be measured is not affected by the driving speed of the work 14. Further, the distance and time to drive the work 14 are also not affected.

Moreover, e.g., in the case where the life, etc. of the gear transmission is determined online based on the magnitude of the output torque of the motor, the output torque of the motor changes depending on the driving speed of the work, and consequently it is necessary to set, in advance, a threshold value corresponding to the actual driving speed of the work. In the case where the driving speed of the work changes, a plurality of threshold values must be set for each of the driving speeds. Further, for example, if the life, etc. of the gear transmission is to be determined based on the magnitude of the output torque of the motor when the gear transmission is rotating at a constant speed, the distance and time of driving the work are limited. In contrast, since in the gear transmission 2 the comparison values Ta (Ta1 to Ta5) are calculated based on the oscillation cycles while the output shaft of the motor is stopped (i.e., while the work is also stopped), it is possible to compare the comparison value Ta with the threshold value Tt regardless of driving speed, driving distance, and driving time of the work. That is, it is possible to detect the remaining life, abnormality, etc. of the gear transmission 2 even if the driving speed of the work when the threshold value Tt was set is different from the driving speed of the work during use.

Specific examples of the present invention are described above in detail, but these examples are merely illustrative and place no limitation on the scope of the patent claims. The technology described in the patent claims also encompasses various changes and modifications to the specific examples described above. The technical elements explained in the present specification or drawings provide technical utility either independently or through various combinations. The present invention is not limited to the combinations described at the time the claims are filed. Further, the purpose of the examples shown by the present specification or drawings is to satisfy multiple objectives simultaneously, and satisfying any one of those objectives gives technical utility to the present invention.

What is claimed is:

1. A usage measuring device for measuring usage of a gear transmission, comprising:
    an oscillation cycle measuring unit configured to measure an oscillation cycle of a state signal indicating at least one of a rotational state of an input unit side and a rotational state of an output unit side of the gear transmission; and
    a comparing unit configured to compare a first oscillation cycle measured during an initial operating period of the gear transmission and a second oscillation cycle measured after the gear transmission has operated for a predetermined time,
    wherein the oscillation cycle measuring unit measures the first oscillation cycle and the second oscillation cycle of the state signal after the gear transmission has stopped driving.

2. The usage measuring device according to claim 1, wherein the state signal is a supply current to a motor connected to the gear transmission.

3. The usage measuring device according to claim 2, wherein the state signal is generated based on a rotation angle of an output shaft of the motor connected to the gear transmission.

4. The usage measuring device according to claim 3, wherein the state signal is generated based on a rotation angle of an output unit of the gear transmission.

5. The usage measuring device according to claim 4, wherein the state signal is generated based on torque of the output unit of the gear transmission.

6. The usage measuring device according to claim 5, wherein the state signal is generated based on acceleration of a driven member attached to an output unit of the gear transmission.

7. The usage measuring device according to claim 6, further comprising: a notification unit configured to compare the first oscillation cycle and the second oscillation cycle, and notify an abnormality of the gear transmission when the second oscillation cycle exceeds a predetermined value relative to the first oscillation cycle.

8. The usage measuring device according to claim 1, wherein the state signal is generated based on a rotation angle of an output shaft of a motor connected to the gear transmission.

9. The usage measuring device according to claim 1, wherein the state signal is generated based on a rotation angle of an output unit of the gear transmission.

10. The usage measuring device according to claim 1, wherein the state signal is generated based on torque of an output unit of the gear transmission.

11. The usage measuring device according to claim 1, wherein the state signal is generated based on acceleration of a driven member attached to an output unit of the gear transmission.

12. The usage measuring device according to claim 1, further comprising: a notification unit configured to compare the first oscillation cycle and the second oscillation cycle, and notify an abnormality of the gear transmission when the second oscillation cycle exceeds a predetermined value relative to the first oscillation cycle.

13. A gear transmission comprising:

a motor;

a gear transmission mechanism; and the usage measuring device according to claim 1.

* * * * *